3084X
O. STITH.
Breech-Loading Fire-Arm.
Patented Mar. 16, 1819.
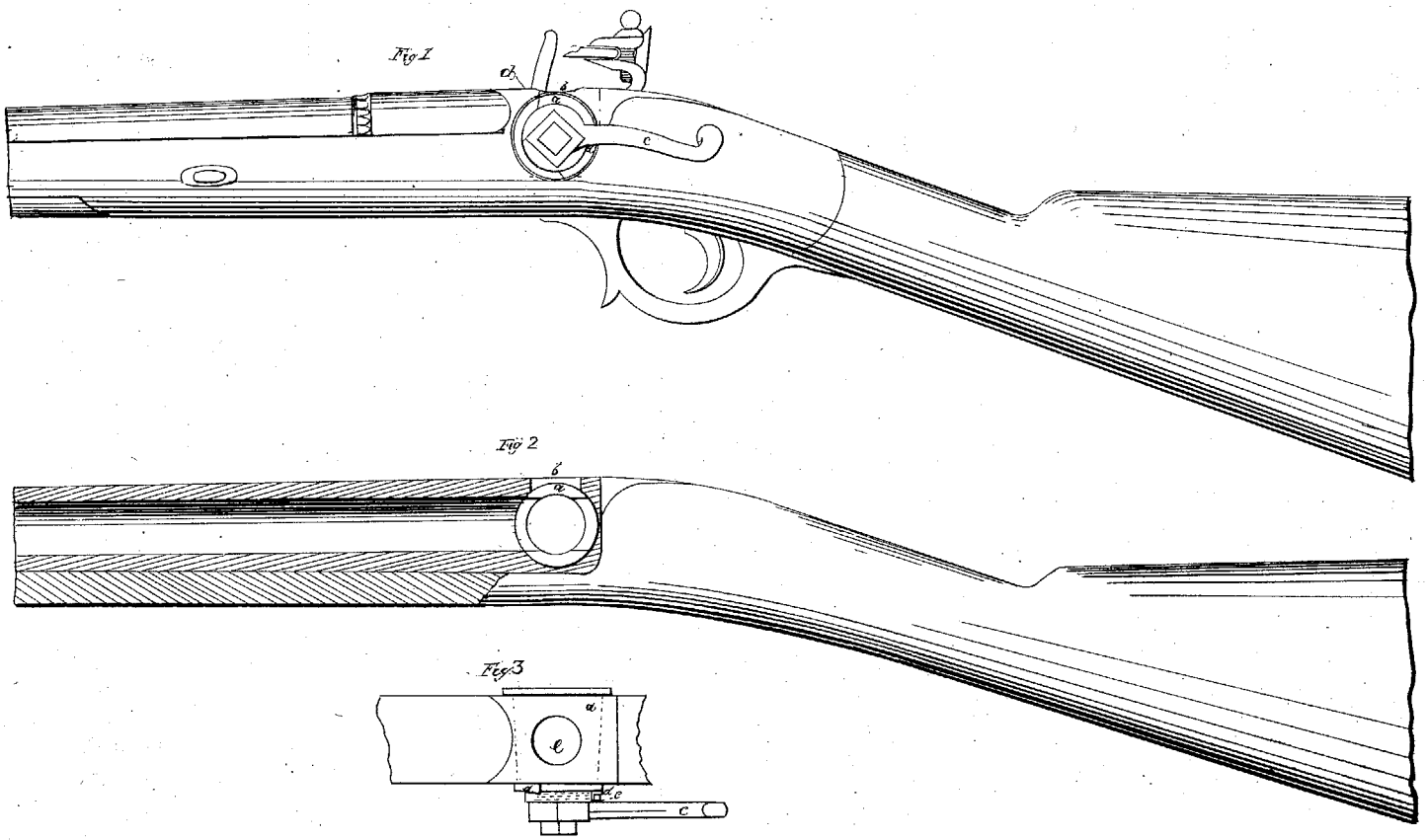
N. PETERS, PHOTO-LITHOGRAPHER, WASHINGTON, D. C.

3084X

UNITED STATES PATENT OFFICE.

OBADIAH STITH, OF BRUNSWICK COUNTY, VIRGINIA.

IMPROVED RIFLE OR GUN.

Specification forming part of Letters Patent dated March 16, 1819.

*To all whom it may concern:*

Be it known that I, OBADIAH STITH, of Brunswick county, Virginia, have invented a new and Improved Rifle or Gun, of which the following is a specification.

The revolving cylinder chambered rifle or gun is constructed nearly as those in common use. The inside of the caliber and the outside of the barrel are formed as other rifles or guns, except the lower end or breech, which is something larger, for the purpose of receiving the revolving cylinder, which crosses the barrel and caliber at right angles immediately at the breech, and resembles the nut of a cock, which, being made air-tight, the caliber is extended through the cylinder. A hole is then made on the top of the barrel, large enough to admit one ball to drop easily through, striking centrally on the cylinder. A key or handle being fixed to the smallest end of the cylinder, with a screw to tighten it, answers the purpose of keeping the cylinder to its proper place and for turning the cylinder to receive its charge. On the side of the handle or key are stops—one to stop the motion of the cylinder when it is in the proper position to receive the load. The ball being dropped in, it falls to the lower side of the chamber in the cylinder. The chamber then being filled with powder, the cylinder is turned back one-fourth of a revolution, when another stop holds it in a position to fire. Thus it answers the purpose of a charger, and renders a ramrod unnecessary in loading. It is therefore called the "charging-cylinder," which may be adapted to any kind of gun or pistol that is charged with a ball, by constructing a proper chamber to receive the charging-cylinder. It may also be constructed by varying the position of the cylinder to receive the load at either side, as convenience may require. A spring or catch may be fixed to hold the cylinder to its proper place when loaded, which will prevent its being moved by an accidental blow on the key or handle. Springs of various kinds may also be fixed for turning the cylinder and for keeping it to its proper place when loaded, if further experience should evince their utility, and with the use of a charging-cylinder a rifle or gun may be loaded much quicker than a common gun can be charged with cartridge, and with great ease and convenience.

OBADIAH STITH.

Witnesses:
WM. ELLIOT,
BENJN. FENWICK.